(12) United States Patent
Silveira

(10) Patent No.: US 8,841,997 B2
(45) Date of Patent: Sep. 23, 2014

(54) VEHICLE ALARM SYSTEM FOR ALERTING A VEHICLE OPERATOR THAT THE VEHICLE IS STILL OCCUPIED WITH A CHILD OR PET

(76) Inventor: Orlando L. Silveira, Belleville, NJ (US)

(*) Notice: Subject to any disclaimer, the term of this patent is extended or adjusted under 35 U.S.C. 154(b) by 9 days.

(21) Appl. No.: 13/507,806

(22) Filed: Jul. 30, 2012

(65) Prior Publication Data

US 2013/0106598 A1  May 2, 2013

Related U.S. Application Data

(60) Provisional application No. 61/628,603, filed on Nov. 2, 2011.

(51) Int. Cl.
*B60Q 1/00* (2006.01)

(52) U.S. Cl.
USPC .............. 340/457.1; 340/457; 340/539.23; 340/573.1; 340/667; 340/686.6

(58) Field of Classification Search
USPC .......... 340/573.1, 573.4, 457, 457.1, 539.21, 340/539.23, 666, 667, 686.1, 686.6; 180/271, 272; 701/29, 45
See application file for complete search history.

(56) References Cited

U.S. PATENT DOCUMENTS

| | | | |
|---|---|---|---|
| 3,898,472 A | 8/1975 | Long | 180/270 |
| 5,802,479 A | 9/1998 | Kithil et al. | 701/45 |
| 5,949,340 A | 9/1999 | Rossi | 340/573.1 |
| 6,024,378 A | 2/2000 | Fu | 280/735 |
| 6,259,362 B1 | 7/2001 | Lin | 340/457 |
| 6,356,203 B1 * | 3/2002 | Halleck et al. | 340/689 |
| 6,714,132 B2 | 3/2004 | Edwards et al. | 340/573.1 |
| 6,847,302 B2 * | 1/2005 | Flanagan et al. | 340/666 |

(Continued)

FOREIGN PATENT DOCUMENTS

| | | | |
|---|---|---|---|
| EP | 0728636 | 8/1996 | B60N 2/00 |
| WO | WO2003100462 | 12/2003 | B60N 2/00 |
| WO | WO2009144687 | 12/2009 | B60N 2/00 |

OTHER PUBLICATIONS

"NASA Develps Child Car Seat Safety Device" found at http://www.nasa.gov/centers/langley/news/releases/2002/02-008.htm.

(Continued)

*Primary Examiner* — Hung T. Nguyen
(74) *Attorney, Agent, or Firm* — Ernest D. Buff, Esq.; Ernest D. Buff & Assoc. LLC; Margaret A. LaCroit

(57) ABSTRACT

A portable vehicle alarm system alerts a vehicle operator of the presence of a child/pet left in the vehicle. The system includes at least one first portable wireless alarm unit in communication with a second portable wireless unit. The first and second portable wireless alarm units include a microprocessor in communication with a transmitter and receiver, having a power supply. The first portable unit is located on a key chain. The second wireless unit has attachment means for attachment to a seat belt associated with a child's car seat or a pet's collar. An activation sensor detects a disengagement action related to the vehicle, including powering-off of the vehicle ignition or unbuckling of the driver's seat belt. A distance sensor has a selected range. If the range is exceeded, an audible alarm is actuated from the first unit.

17 Claims, 5 Drawing Sheets

(56) References Cited

U.S. PATENT DOCUMENTS

| | | | |
|---|---|---|---|
| 6,922,147 B1 | 7/2005 | Viksnins et al. | 340/573.1 |
| 6,998,988 B1 | 2/2006 | Kalce | 340/573.1 |
| 7,012,533 B2 | 3/2006 | Younse | 340/573.1 |
| 7,170,401 B1 * | 1/2007 | Cole | 340/457 |
| 7,218,218 B1 | 5/2007 | Rogers | 340/522 |
| 7,230,530 B1 * | 6/2007 | Almquist | 340/539.15 |
| 7,339,463 B2 | 3/2008 | Donaldson | 340/457 |
| 8,058,983 B1 | 11/2011 | Davisson et al. | 340/457 |
| 8,190,332 B2 | 5/2012 | Saban | 701/45 |
| 8,212,665 B2 * | 7/2012 | Schoenberg et al. | 340/457 |
| 8,430,451 B1 * | 4/2013 | Heinz | 297/180.12 |
| 2002/0161501 A1 | 10/2002 | Dulin et al. | 701/45 |
| 2003/0122662 A1 * | 7/2003 | Quinonez | 340/457 |
| 2003/0222775 A1 | 12/2003 | Rackham et al. | 340/457 |
| 2004/0160320 A1 * | 8/2004 | Edwards et al. | 340/539.21 |
| 2007/0057799 A1 * | 3/2007 | Monzo et al. | 340/573.1 |
| 2007/0222622 A1 | 9/2007 | Sweeney | 340/573.1 |
| 2009/0079557 A1 * | 3/2009 | Miner | 340/457.1 |
| 2009/0259369 A1 | 10/2009 | Saban | 701/45 |

OTHER PUBLICATIONS

"Child-in-car sensor just part of nanny technology" found at http://www.usatoday.com/money/autos/2001-01-27-nanny.htm.

* cited by examiner

VEHICLE ALARM SYSTEM FOR ALERTING A VEHICLE OPERATOR THAT THE VEHICLE IS STILL OCCUPIED WITH A CHILD OR PET

This application claims the benefit of Provisional Application No. 61/628,603, filed Nov. 2, 2011 and entitled Automobile Alarm System, the subject matter of which is specifically incorporated herein in its entirety by reference thereto.

BACKGROUND OF THE INVENTION

1. Field of the Invention

The present invention relates to vehicular safety devices; and, more particularly, to a system that alerts when a child or pet is left unattended in a vehicle.

2. Description of the Prior Art

Every year children die, or suffer physical and emotional trauma from being left unattended in vehicles and exposed to prolonged heat, or cold. On hectic and busy days, it can be very easy for adults to experience momentary confusion and lapses in judgment. Parents and caregivers can be particularly susceptible to this, particularly as juggling the demands of career and family can cause one to lose focus on the task at hand, despite good intentions and diligence. In a hurry, the parent/care giver may consider it safe to leave a child in the car while quickly dashing into the establishment, or they may be so distracted that they leave the child behind without realizing they have done so.

Unfortunately, leaving a child alone in a car, even for a short period of time, can lead to tragic circumstances, especially on hot days. For instance, on a sunny afternoon with outside temperatures at a comfortable 73 degrees, the temperature within a vehicle can rise to 100 degrees in just 10 short minutes, and 120 degrees in a half hour. At 90 degrees outside, the interior of a vehicle can heat up to 160 degrees within several minutes.

A child's developing respiratory system makes them particularly vulnerable to heat exhaustion. As the heat rises, the body temperatures rise. An infant left in a vehicle during 100-degree heat can quickly suffer from heat stroke, with their body rapidly approaching the temperature of their environment. This problem is not limited to infants and children but is also subject to pets. Whether one is distracted and has forgotten that they have brought the family dog along on a morning's errands, or was in the process of dropping the family cat off at the vet's office when they were sidetracked by a business phone call or comparable distraction, the result can be that one leaves their animal unattended. Consequently, the animal is at risk for heat stroke or suffocation in the confines of the hot vehicle.

Problems associated with various heretofore disclosed and utilized safety type devices appointed to determine the presence of an infant or children in a vehicle concern effectiveness of these devices as well as battery life constraints. Effectiveness of such devices is limited, owing to the direct integration thereof within constructs of a car seat or infant seat. As a result, the device is not portable so it cannot be utilized outside of the presence of the vehicle and it cannot be utilized for a different seat. Further, many devices sense the presence of the infant/child by way of weight sensors integrated within the seat. In cases wherein the child or toddler unbuckles him/herself while within the car or is otherwise no longer seated within the seat with the sensor, the presence of the child will not be detected. Battery problems attending to such devices are also prevalent. Frequently, after prolonged use and constant engagement owing to the sensing of the child/infant in the seat, batteries within the device must be regularly replaces and monitored. Too often, the batteries become weak and require replacement, which cannot always be achieved promptly.

There remains a need in the art for a vehicular safety device notifying a user of the presence or occupation of a child or pet having a portable wireless alarm unit that is in communication with a second portable wireless unit so that the device can be used within a vehicle or outside of a vehicle. Further, there is a need in the art for a vehicular safety device that conserves battery power and life when the danger to the child or infant or pet is minimal.

SUMMARY OF THE INVENTION

The present invention is directed to an automobile alarm system that provides an effective and affordable way to prevent tragedies associated with infants/children or pets left in a vehicle. The present invention offers unique portability so that the system can also readily be utilized outside of the vehicle or for other uses where desired. By simply attaching one part of the unit to a child's car seat, stroller or clothing and the other part to a user's key chain, wallet, person, or outside of a purse, the user will be alerted if he/she and the child are separated by an adjustable distance. The automobile alarm system of the subject invention serves as audible reminder that a child or pet has been accidentally left in a parked vehicle or left within an unacceptable distance from the user. In addition, the present automobile alarm system conserves battery life, as it is activated when the risk is at the highest level, which is when the vehicle is in the off condition.

The automobile alarm system includes at least one first portable wireless alarm unit. The first portable wireless alarm unit has a speaker for generating an audible alarm, a microprocessor in communication with a transmitter and receiver, and a power source. The power source is preferably a battery, either replaceable and/or rechargeable. The first unit is remote and is adapted to remain within possession of a driver/user when the driver exits a vehicle. The alarm system further includes a second portable wireless unit in communication with the first portable wireless alarm unit. The second portable wireless unit includes a microprocessor in communication with a transmitter and receiver, and a power source. Like the first unit, the power source if preferably a battery, replaceable or rechargeable. The second wireless unit has attachment means for attachment to an object; this object is preferably a seat belt associated with a child's car seat. The alarm system further includes an activation sensor for detecting a disengagement action related to a vehicle. The activation sensor is in communication with at least the first portable wireless alarm unit for activating the unit from a standby mode. The standby mode may include a hibernation mode or may include an off mode. A distance/range sensor is also included. The distance range sensor has a selected range integrated within the first or second wireless unit, wherein if the selected range is exceeded an audible alarm is actuated from the first unit.

BRIEF DESCRIPTION OF DRAWINGS

The invention will be more fully understood and further advantages will become apparent when reference is had to the following detailed description and the accompanying drawings, in which.

DESCRIPTION OF THE PREFERRED EMBODIMENTS

Figure 1:
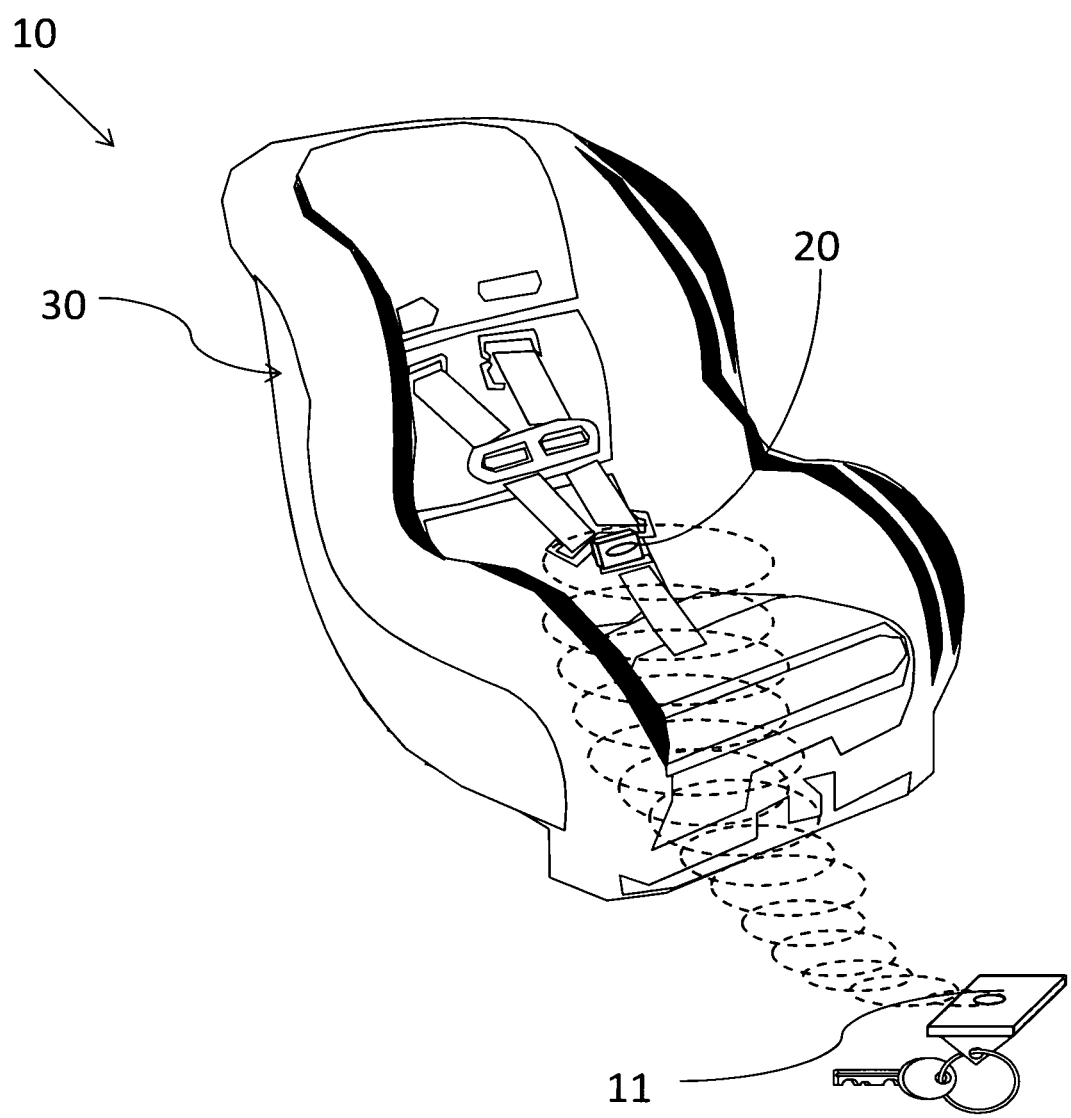
FIG. 1 illustrates a schematic view of the automobile alert/alarm system, showing the system in use with an infant car seat.

The present invention is directed to an automobile alarm system for alerting a vehicle operator/owner that the vehicle is still occupied with their child or pet. The present invention's automobile alarm system includes a first portable wireless alarm unit that is in communication with a second portable wireless unit. An audible sound is actuated via the first portable wireless alarm unit when the first portable wireless alarm unit exceeds a selected distance/range from the second unit.

Engagement or turning-on the sensor takes place when the first portable wireless alarm unit is activated. In turn, activation of the first portable wireless alarm unit is preferably achieved via a vehicle ignition sensor wherein the first unit senses if the vehicle ignition is turned off. Alternatively, activation of the first portable wireless alarm unit is achieved via a seat belt sensor at the driver's seat wherein the unit senses if the driver's seat belt is disengaged. Once the first unit is activated, it must be switched off manually by the user or put on standby manually by the user. In this condition, the device is merely on low battery use standby and/or off when the first unit is not activated. As a result, the battery life is extended significantly because it is not needlessly activated or engaged when the driver is actually driving. For example, on commutes or long drives when the first unit is in standby or off, very little battery power is utilized in the device; when the vehicle reaches its destination and is turned off the unit is activated out of standby/or turned on so that the first unit immediately begins scanning for the presence of the second unit. At this point the first unit can also in turn activate the second unit from the standby status; alternatively, the second unit may be switched on manually when the infant is placed in the seat.

Once the first and second units are activated, the first unit scans for the local distance of the second unit (or vice versa). If the first unit enters a distance outside of the radius designated, the audible alarm, and optionally lights, will sound from the first unit. Alternatively, the units can be integrated into a program downloaded onto a cellular phone as a phone application, wherein the cellular phone will give off an alarm and/or automatically call up to at least three different phone numbers.

Inasmuch as activation is predicated upon either turning off of the vehicle and/or the disengagement of the driver's seat belt, the overall battery life of the system is significantly increased. The device rests in standby or off, with the result that the amount of battery usage is very low. Usage of the device in general is needed when the vehicle is off—or parked. On the other hand, battery usage is not critical when the vehicle is on because the driver is at that time present within the vehicle. Thus, battery life is not used unnecessarily during actual driving. Advantageously, this arrangement prevents loss of battery life which would otherwise occur during long trips and other situations wherein extended driving time or residence within the vehicle would considerably drain battery life.

As noted, both the first and second wireless alarm units are portable. The first portable wireless alarm unit is adapted to remain in the possession of a driver when the driver exits the vehicle. In this respect, preferably the first portable wireless alarm unit is a compact unit that fits comfortably within a pocket of trousers, shirts, dresses, skirts or jackets/coats. Preferably, the first portable wireless alarm unit includes an appendage that allows the unit to be housed on a key chain in conjunction with car keys.

The second wireless unit includes attachment means for attachment to an object, wherein the object may include a seat belt harness associated with a child's car seat, an object of importance, or an animal's pet collar. The second wireless unit is also portable in nature and preferably is automatically activated through activation signal from the first unit. Alternatively, the second wireless unit is manually activated by way of an on/off button. The first wireless unit includes a transmitter and receiver, wherein the unit is activated when the user has turned off the vehicle ignition, or when the seat belt is disengaged. The second wireless unit has a corresponding receiver in communication with the first wireless unit.

The second unit is to be attached near, or on the car seat belt latch so that, when the second unit is in manual mode, the adult will always remember to turn it on when the child is put in the seat and turn it off when the child is removed. The subject system remains engaged when the vehicle is off/seatbelt is disengaged and thus provides the ability to continue to utilize the device outside of the vehicle, i.e. on a stroller or the like, while also allowing the system to be utilized on important items or the like. If the child is removed and will either be walking with the adult, or riding in a stroller, the subject device can be left active and the second unit moved from the car seat to the child's clothing to prevent separation while shopping or playing outdoors.

The present invention offers unique portability so that the system can also readily be utilized outside of the vehicle or for other uses where desired. By simply attaching one part of the unit to a child's car seat, stroller or clothing and the other part to a user's key chain, wallet, person, or outside of a purse, the user will be alerted if he/she and the child are separated by an adjustable distance. The automobile alarm system of the subject invention serves as audible reminder that a child or pet has been accidentally left in a parked vehicle or left within an unacceptable distance from the user. Moreover, the present automobile alarm system conserves battery life as it is activated when the risk is at the highest level, which is when the vehicle is in the off condition.

The automobile alarm system includes at least one first portable wireless alarm unit. The first portable wireless alarm unit has a speaker for generating an audible alarm, a microprocessor in communication with a transmitter and receiver, and a power source. The power source is preferably a battery, either replaceable and/or rechargeable. The first unit is remote and is adapted to remain within possession of a driver/user when the driver exits a vehicle. The alarm system further includes a second portable wireless unit in communication with the first portable wireless alarm unit. The second portable wireless unit includes a microprocessor in communication with a transmitter and receiver, and a power source. Like the first unit, the power source if preferably a battery, replaceable or rechargeable. The second wireless unit has attachment means for attachment to an object; this object preferably being a seat belt associated with a child's car seat. The alarm system further includes an activation sensor for detecting a disengagement action related to a vehicle. The activation sensor is in communication with at least the first portable wireless alarm unit for activating the unit from a standby mode. The standby mode may include a hibernation mode or may include an off mode. A distance/range sensor is also included. The distance range sensor has a selected range integrated within the first or second wireless unit, wherein if the selected range is exceeded an audible alarm is actuated from the first unit.

Figure 2:
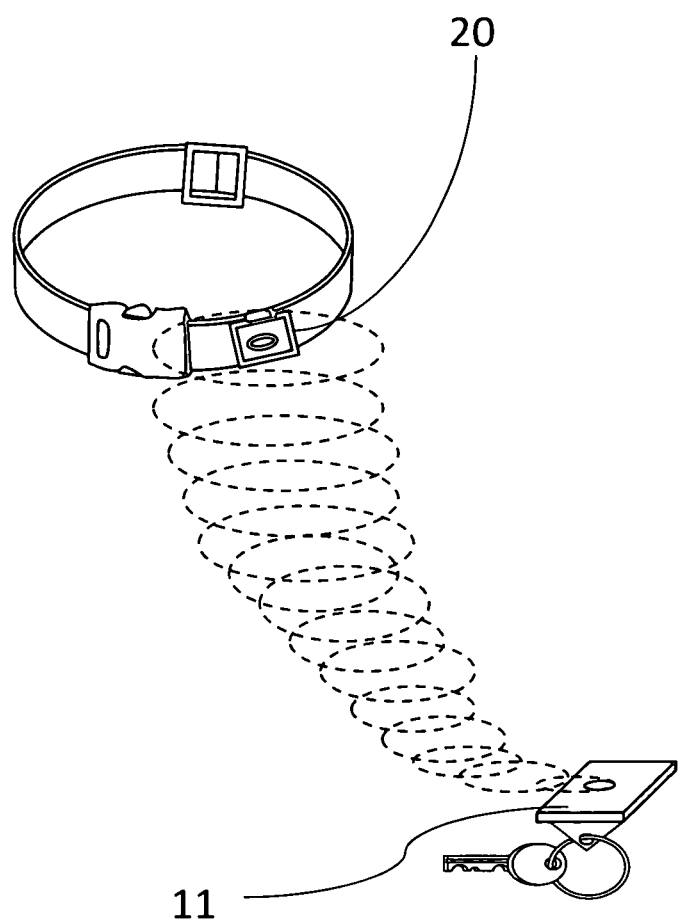
FIG. 2 illustrates a schematic of the system of FIG. 1.
Figure 3:
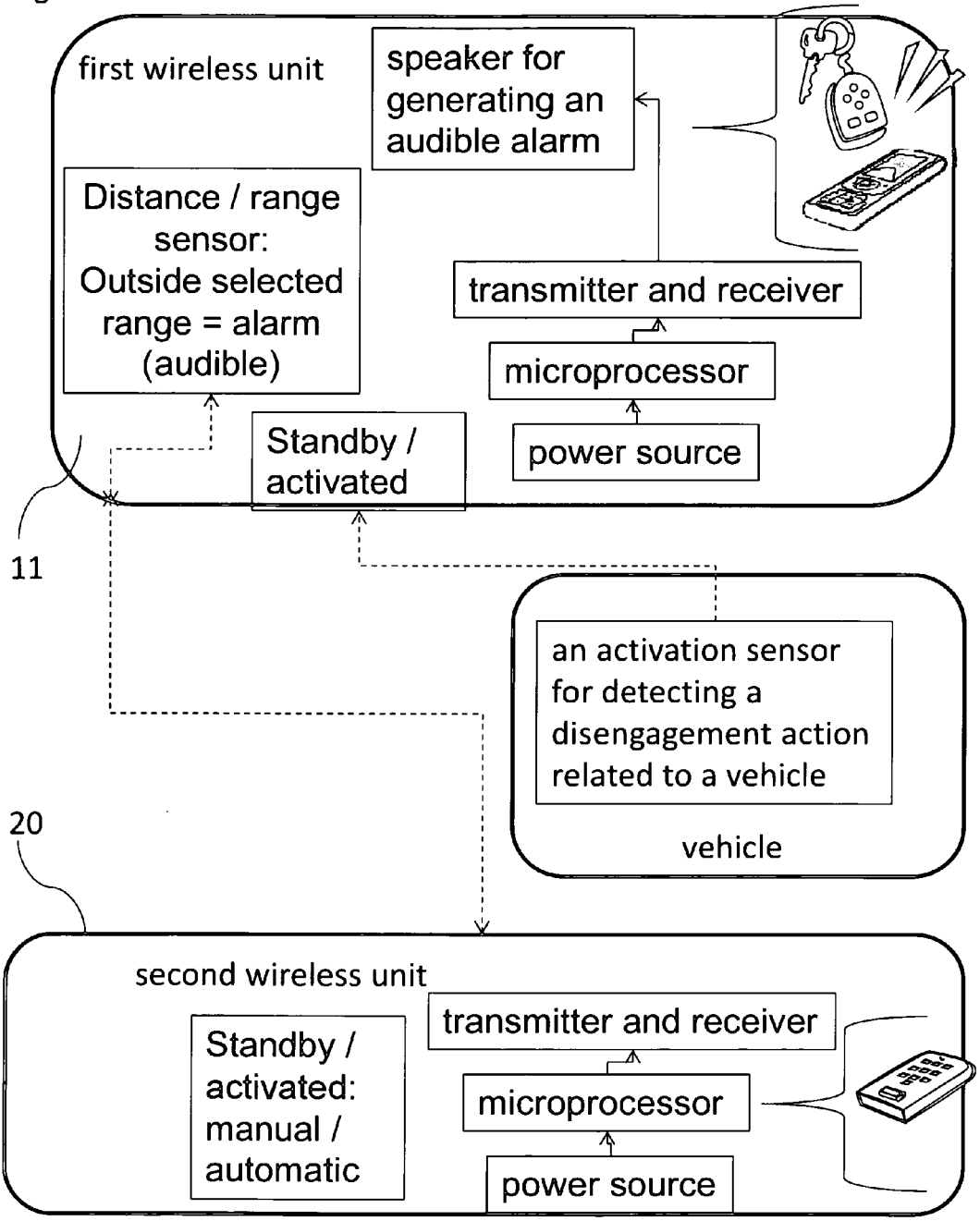
FIG. 3 illustrates a flow chart of an embodiment of the automobile alert/alarm system.
Figure 4:
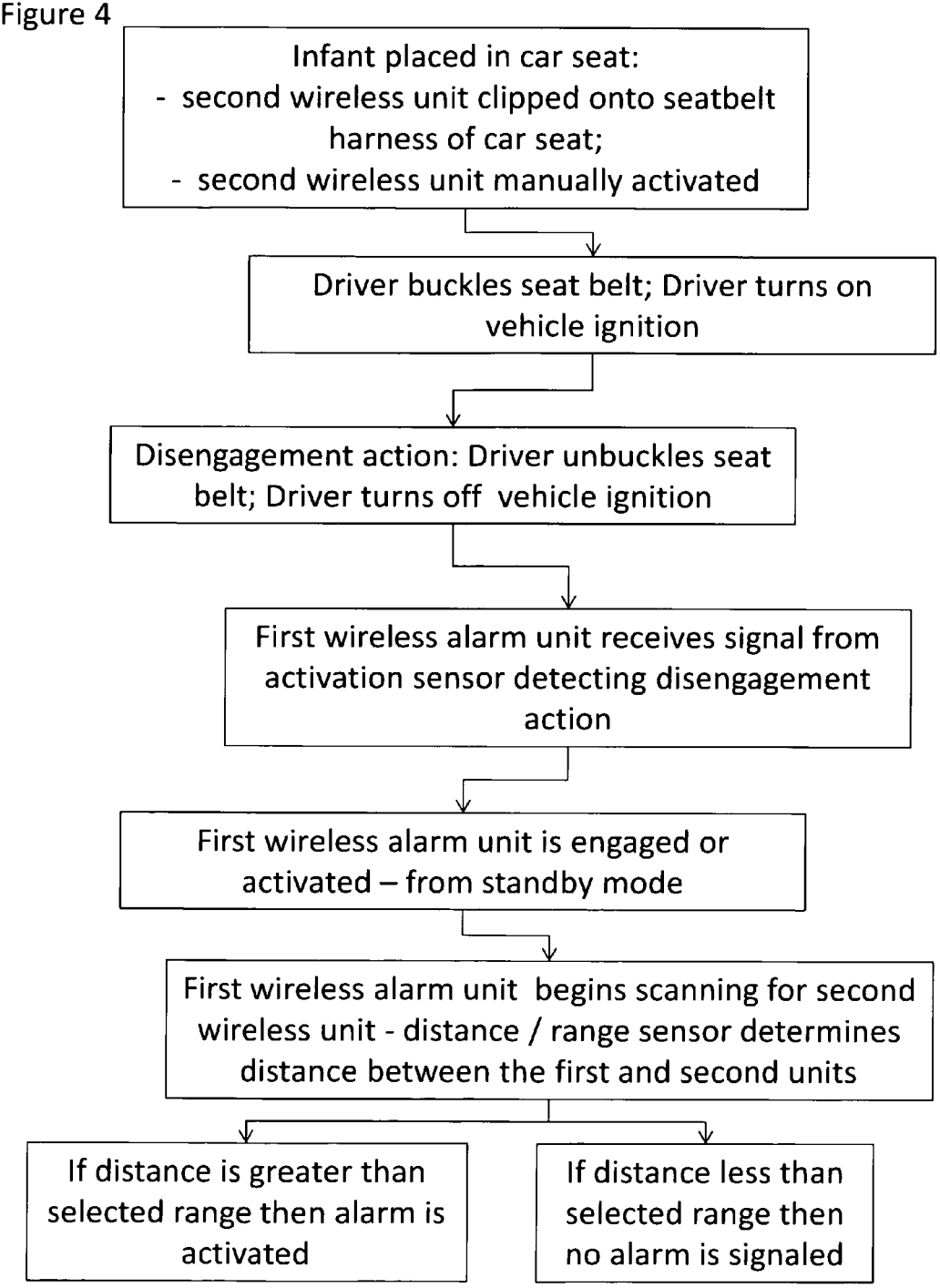
FIG. 4 illustrates a flow chart of an embodiment of the automobile alert/alarm system showing the steps carried out.
Figure 5:
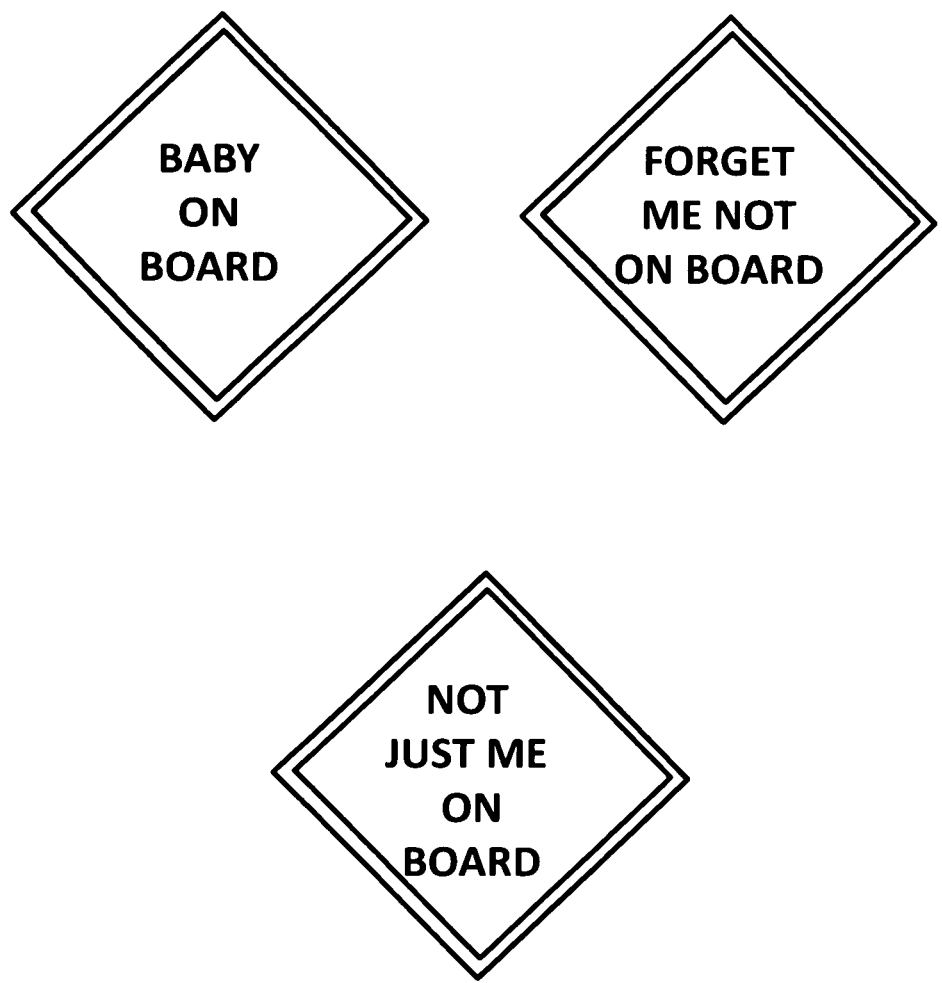
FIG. 5 illustrates a schematic view of the automobile alert/alarm system, showing the system in use with a pet collar.

FIG. 1 illustrates a schematic view of the automobile alert/alarm system, showing the system in use with an infant car seat. FIG. 2 shows a schematic of the system of FIG. 1. FIG. 3 illustrates a flow chart of an embodiment of the automobile alert/alarm system. FIG. 4 illustrates a flow chart of an embodiment of the automobile alert/alarm system showing the steps carried out. FIG. 5 illustrates a schematic view of the automobile alert/alarm system, showing the system in use with a pet collar.

Referring to FIGS. 1-5, the automobile alarm system of the present invention in shown generally at 10. Alarm system 10 includes a first portable wireless alarm unit 11 that is in communication with a second wireless unit 20. First portable wireless alarm unit 11 works in conjunction with the vehicle ignition and/or seat belt wherein the unit 11 senses if the vehicle ignition is turned off, or if the seat belt is disengaged. The second wireless unit 20 may be incorporated into the design of the child's car seat 30, provided as an aftermarket attachment to the child's seat, or to an animal's pet collar (see FIG. 5, 120). The system/first wireless unit 11 generally functions as a transmitter and receiver, with the alarm system unit 11 activated when the user has turned off their vehicle ignition, or when the seat belt is disengaged. A corresponding receiver system is incorporated into the design of the vehicle safety seat or a pet collar second wireless unit 20 (120 in FIG. 5). Preferably, when unit 11 is within a given radius of second unit 20 the unit remains silent; however, when unit 11 becomes outside the given radius of the second unit 20 unit 11 emits a loud audible alarm and/or flashing lights. The given radius or distance preferably ranges from 0 to 80 feet. Unit 11 emits a continual audio alarm and flashing light when distance is exceeded. It is recommended that the transmitter/unit 20 be attached near, or on, the car seat belt latch so that the adult will always remember to turn it on when the child is put in the seat and turn it off when the child is removed. If the child is removed and will either be walking with the adult, or riding in a stroller, it is recommended the alarm be left active and unit 20 moved from the car seat to the child's clothing to prevent separation while shopping or playing outdoors. Attachment means preferably includes mating straps including fastening means thereon, such as hook and loop fasteners as commonly sold under the trade name VELCRO.

The alarm mechanism is generally rectangular in shape, but can be formed in a plethora of shapes and designs, and measures approximately 1 inch in width by 1 inch in length, and ⅜ inch in total depth. Featuring a shatterproof plastic or metal casing, the computer circuitry and electronic sensor and other components necessary to power this alarm are incorporated into the design of the unit, with a high pitched or chiming alarm emitted upon activation. Vehicle safety seats and pet collars which feature the system incorporated into its design are similar in appearance and function to traditional car seats or animal collars. Pet collars in the system line can be manufactured of nylon, canvas or fancy leather material and can be fully adjustable produced in a range of sizes to accommodate various sizes and breeds of dogs and cats.

As mentioned, the most notable aspect of both the automobile alarm system is found in the integrated sensor mechanism which activates the internal alarms. The sensor features a simple receiver which works in conjunction with a companion transmitter mounted on the vehicle ignition or safety belt, activating the alarm when the user turns off their vehicle or disengages their safety belt. Both the transmitter and receiver unit utilize a battery source such as the micro alkaline or silver oxide cell batteries commonly found in wristwatches.

Use of the automobile alarm system of the present invention is very simple and straightforward. Users purchase infant car seats or pet collars in accordance with preferred design and style, employing these devices according to easily followed installation or application instructions. After installing the transmitter mechanism on the driver seat belt/ignition, the system is ready for use. When a user has driven to a chosen destination, turns off their car and removes their seat belt in order to exit the vehicle, the integrated sensor mechanism is triggered, activating the integrated alarm mechanism to remind the driver to remove their child from their car seat, or their pet from the back of their vehicle. The user then disengages the alarm, readying the unit for its next use.

The automobile alarm system provides users several significant benefits and advantages. Foremost, the system provides parents and pet owners a practical security system effectively preventing them from unintentionally leaving a helpless child or pet behind in a car. While most conscientious caregivers may never willfully put their loved ones or treasured pets at risk, the system provides a way for them to avoid the accidental leaving a child or pet at the mercy of a hot, airless vehicle. Utilizing state of the art technology, the system detects when the vehicle ignition has been shut off or the driver's safety belt has been disengaged, thus ensuring that the harried or distracted motorist is reminded to remove their child or pet, prior to exiting their car. In this manner, the forgetful adult is served with a clear, audible reminder that they must return to the vehicle immediately.

The automobile alarm system of the present invention provides car owners with confidence and peace of mind. Preventing the accidental leaving of children or a pet in a sweltering vehicle, the system effectively prevents serious injury or even death. The system does not require installation of wires, and can be adjusted from 0 to 80 feet in most surroundings. It emits a continual audio alarm and flashing light when distance is exceeded. It is recommended that the transmitter be attached near, or on, the car seat belt latch so that the adult will always remember to turn it on when the child is put in the seat and turn it off when the child is removed. If the child is removed and will either be walking with the adult, or riding in a stroller, it is recommended the alarm be left active and moved from the car seat to the child's clothing to prevent separation while shopping or playing outdoors. The device has several other uses, for example, it can be attached to a personal possession that may be left behind, such as a briefcase, laptop, purse, luggage, or an item one really need (i.e. an ice cream cake one picked up for a party). It will also alert the user if someone tries to remove the item from a given location. Further, it has applications with use for the mentally challenged, or elderly, who may have a tendency to wander off, or for any young child at a picnic or campsite where you would be alerted before they had a chance to wander out of sight.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. An automobile alarm system comprising:
 a. at least one first portable wireless alarm unit having a speaker for generating an audible alarm, a microprocessor in communication with a transmitter and receiver, and a power source, wherein said unit is adapted to remain within possession of a driver/user when said driver exits a vehicle;

b. a second portable wireless unit in communication with said first portable wireless alarm unit and having a microprocessor in communication with a transmitter and receiver, and a power source;

c. said second wireless unit having attachment means for attachment to an object;

d. said automobile alarm system being capable of being used both within a vehicle and outside of a vehicle;

e. an activation sensor for detecting a disengagement action related to a vehicle in communication with at least said first portable wireless alarm unit for activating said unit from a standby mode;

f. a distance/range sensor having a selected range from 1 to 30 feet integrated within said first or second wireless unit, wherein if said selected range is exceeded an audible alarm is actuated from said first unit.

2. An automobile alarm system as recited by claim 1, wherein said second wireless unit's attachment means is constructed as a clasp for removable attachment to said object.

3. An automobile alarm system as recited by claim 2, wherein said object is a child's car seat belt.

4. An automobile alarm system as recited by claim 2, wherein said object is a pet collar.

5. An automobile alarm system as recited by claim 1, wherein said activation sensor is a vehicle ignition sensor that senses when said vehicle ignition is in the off condition.

6. An automobile alarm system as recited by claim 1, wherein said activation sensor is a vehicle ignition sensor that senses when said vehicle ignition goes from an on condition to an off condition.

7. An automobile alarm system as recited by claim 1, wherein said activation sensor disengagement action is a driver's seat belt sensor that senses when said driver's seat belt is disengaged or unbuckled.

8. An automobile alarm system as recited by claim 1, wherein said activation sensor disengagement action is a driver's seat belt sensor that senses when said driver's seat belt is engaged or buckled followed directly by disengagement or unbuckling.

9. An automobile alarm system as recited by claim 1, wherein said second unit comprises a second unit activation sensor that provides for automatic engagement of said second unit, wherein said second unit activation sensor detects activation of said first portable wireless alarm unit upon its activation resulting form said activation sensor.

10. An automobile alarm system as recited by claim 1, wherein said first portable wireless alarm unit comprises an on/off switch for manual activation.

11. An automobile alarm system as recited by claim 1, wherein said second unit comprises an on/off switch for manual activation.

12. An automobile alarm system as recited by claim 1, wherein said first wireless unit is formed having an appendage to render a key chain member/or be attached to a keychain.

13. An automobile alarm system as recited by claim 1 comprising a smart phone application programmable and downloadable within a smart phone for transmitting said alarm to said first portable wireless alarm unit and said smart phone.

14. An automobile alarm system as recited by claim 1, wherein said first portable wireless alarm unit is a smart phone, said smart phone comprising a smart phone application programmable and downloadable for transmitting said alarm directly to said smart phone.

15. An automobile alarm system as recited by claim 1, wherein said first portable wireless alarm unit includes flashing lights in addition to said audible alarm.

16. An automobile alarm system as recited by claim 1, wherein said distance/range sensor's said selected range is from about 3 feet to about 80 feet.

17. An automobile alarm system as recited by claim 1, wherein said distance/range sensor's said selected range is from about 10 feet to about 20 feet.

* * * * *